(12) United States Patent
Neuman

(10) Patent No.: US 7,631,132 B1
(45) Date of Patent: Dec. 8, 2009

(54) METHOD AND APPARATUS FOR PRIORITIZED TRANSACTION QUEUING

(75) Inventor: Paul S. Neuman, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 423 days.

(21) Appl. No.: 11/023,137

(22) Filed: Dec. 27, 2004

(51) Int. Cl.
G06F 12/00 (2006.01)
G06F 13/362 (2006.01)
G06F 13/00 (2006.01)
G06F 9/44 (2006.01)
G06F 11/00 (2006.01)

(52) U.S. Cl. .................. 710/244; 710/113; 710/310; 711/151; 712/228; 370/230

(58) Field of Classification Search .......... 710/244, 710/113, 224, 310; 711/151; 712/228; 370/230
See application file for complete search history.

(56) References Cited

U.S. PATENT DOCUMENTS

| | | | | |
|---|---|---|---|---|
| 5,485,586 | A * | 1/1996 | Brash et al. | 710/112 |
| 5,590,310 | A * | 12/1996 | Willenz et al. | 711/146 |
| 5,649,157 | A * | 7/1997 | Williams | 711/151 |
| 5,832,304 | A * | 11/1998 | Bauman et al. | 710/40 |
| 5,999,534 | A * | 12/1999 | Kim | 370/395.42 |
| 6,442,655 | B1 * | 8/2002 | Eberhard et al. | 711/151 |
| 6,539,457 | B1 * | 3/2003 | Mulla et al. | 711/131 |
| 6,611,527 | B1 * | 8/2003 | Moriwaki et al. | 370/412 |
| 6,728,265 | B1 * | 4/2004 | Yavatkar et al. | 370/468 |
| 6,813,767 | B1 * | 11/2004 | Willke | 718/101 |
| 6,889,295 | B2 * | 5/2005 | Watts | 711/151 |
| 6,895,454 | B2 * | 5/2005 | Barrick | 710/54 |
| 6,901,507 | B2 * | 5/2005 | Wishneusky | 712/228 |
| 6,963,962 | B2 * | 11/2005 | Ramagopal et al. | 711/169 |
| 7,039,770 | B1 * | 5/2006 | Chen et al. | 711/151 |
| 7,239,646 | B1 * | 7/2007 | Sindhu et al. | 370/461 |
| 2004/0095901 | A1 * | 5/2004 | Rajkotia | 370/328 |
| 2004/0117529 | A1 * | 6/2004 | Solomon et al. | 710/113 |
| 2004/0122995 | A1 * | 6/2004 | Tan et al. | 710/36 |
| 2004/0243771 | A1 * | 12/2004 | Oldfield et al. | 711/151 |
| 2005/0060502 | A1 * | 3/2005 | Tan et al. | 711/150 |
| 2006/0059319 | A1 * | 3/2006 | Frenzel et al. | 711/151 |
| 2006/1005931 | * | 3/2006 | Frenzel et al. | 711/151 |

OTHER PUBLICATIONS

IDT, FIFO Applications Guide, Sep. 1999.*

* cited by examiner

Primary Examiner—Mark Rinehart
Assistant Examiner—Christopher A Daley
(74) Attorney, Agent, or Firm—Robert P. Marley; Hollingsworth and Funk LLC

(57) ABSTRACT

A first queue receives transactions from a transaction source in first-in/first-out (FIFO) order regardless of priority. A second queue receives lower priority transactions from the first queue as compared to the higher priority transactions remaining in the first queue. A priority check module controls the forwarding schedule of transactions from the first and second queues in accordance with the associated priorities of the stored transactions. Should an address conflict arise between transactions in the first and second queues, the priority check module stalls forwarding from the first queue while promoting forwarding from the second queue during the conflict condition.

14 Claims, 6 Drawing Sheets

METHOD AND APPARATUS FOR PRIORITIZED TRANSACTION QUEUING

FIELD OF THE INVENTION

The present invention relates in general to transaction queuing, and more particularly to a method and apparatus for prioritized transaction queuing, which facilitates transaction transfer according to the priority of the transaction.

BACKGROUND OF THE INVENTION

Current large-scale computing systems often rely on multiple processors and memory banks for performing various computer functions and executing application programs. Data processing on such computing systems generally requires a large quantity of transaction transfers between different subsystems of the computing system, such as write/read requests for data to/from memory. Such transactions may occur concurrently, and in many cases may involve the same target memory location(s). To accommodate the orderly transfer of transactions within such multi-processing and/or multi-memory systems, the transactions may require temporary buffering, where the transactions are temporarily stored until the appropriate source or destination components are prepared to operate on the data. Traditional methods of data buffering often involve First-In, First-Out (FIFO) queues that involves the temporary storage of such transactions (and associated data where applicable) until a particular processor or memory can process the transaction.

A FIFO sends transactions in the order the transactions are received. A first transaction received by a FIFO buffer is the first transaction sent by the FIFO buffer. The priority of the first transaction compared to a second transaction may vary. For example, a low priority first transaction may be followed at a later time by a high priority second transaction that may need to be sent to a destination location in an urgent manner. Meanwhile, the destination location of the first transaction may not be ready to receive the first transaction. However, with a traditional FIFO the first transaction received by the FIFO will be the first transaction sent to its appropriate destination location. The higher-priority second transaction may be significantly delayed before arriving at its destination location.

A second approach for buffering transactions includes non-FIFO buffers with additional logic. Transactions in a non-FIFO buffer are transferred in an order determined by the additional logic as a function of the priority of the transactions. For example, high priority transactions can be transferred from the buffer prior to earlier-received low priority transactions. However, the additional logic increases circuit complexity.

Prior approaches for buffering transactions include FIFO buffers and non-FIFO buffers with additional logic. The first approach cannot distinguish between high and low priority transactions. High priority transactions are slowed by the transfer of low priority transactions previously received by the FIFO. The additional logic of the second approach requires additional design, layout, software development, and test development time. Additional layout space is also required for the additional logic resulting in less compact designs. Project development cycles are slowed by implementing the additional logic.

For many computing systems, transaction transfer efficiency related to transaction buffering directly impacts overall computing system performance. Accordingly, it would be desirable to provide an apparatus and method for addressing these needs and other challenges mentioned above.

SUMMARY OF THE INVENTION

The present invention is directed to a method and apparatus for transferring prioritized transactions with FIFO buffers. Each transaction has a priority level that determines how quickly the transaction will be transferred. A main FIFO buffer and an aside FIFO buffer are used to transfer the transactions according to the priority of the transactions.

In accordance with one embodiment of the invention, a method for prioritized queuing of transactions comprises prioritizing received transactions into first and second queues. The second queue provides storage for low priority transactions while the first queue provides storage for relatively higher priority transactions. The method further comprises comparing an address associated with a high priority transaction in the first queue with addresses associated with low priority transactions in the second queue, and forwarding low priority transactions ahead of the high priority transaction in response to an address match between the low priority transactions and the high priority transaction.

In accordance with another embodiment of the invention, a circuit for prioritized queuing of transactions comprises a first buffer that is coupled to receive transactions, a priority check module that is coupled to the first buffer and is adapted to detect a priority level of the received transactions, and a second buffer that is coupled to the first buffer and is adapted to receive transactions from the first buffer. The received transactions have a lower priority as compared to higher priority transactions remaining in the first buffer. The circuit further comprises a conflict detector that is coupled to the first and second buffers and is adapted to determine address conflicts between transactions in the first and second buffers.

In accordance with another embodiment of the invention, a circuit for prioritized queuing of transactions comprises means for prioritizing received transactions into first and second queuing means. The second queuing means provides storage for low priority transactions while the first queuing means provides storage for relatively higher priority transactions. The circuit further comprising means for comparing an address associated with a high priority transaction in the first queuing means with addresses associated with low priority transactions in the second queuing means and means for forwarding low priority transactions ahead of the high priority transaction in response to an address match between the low priority transactions and the high priority transaction.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION

Figure 1:
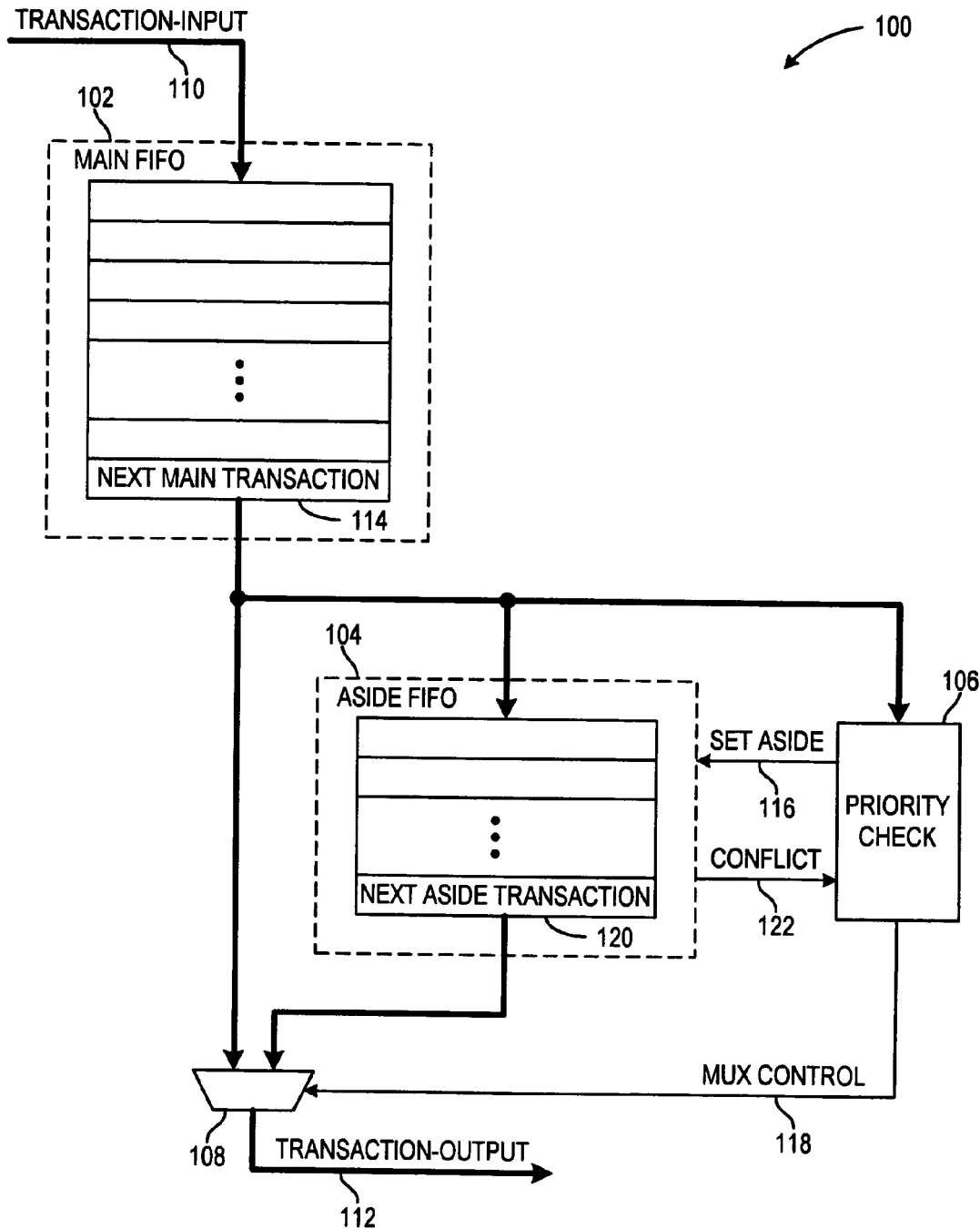
FIG. 1 illustrates a block diagram for queuing prioritized transaction requests in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized as structural and operational changes are made without departing from the scope of the present invention.

Computer systems may have subsystems that produce and consume transactions to accomplish the tasks for an application program executed by the computer system. For example, a processor subsystem may produce a data request transaction that is consumed by a memory subsystem, and the memory may later produce a corresponding data response transaction that is consumed by the processor. The rate that transactions are produced and consumed by the subsystems of the computer system may affect the performance of the application. Application throughput is one important performance measure that may be directly affected by the rate that transactions are produced and consumed by the subsystems of a computer system. Generally, computer systems are designed to maximize performance measures such as application throughput, while remaining within resource limits such as integrated circuit area, integrated circuit pin count, development schedule, and project budget.

A source subsystem that produces transactions may be directly connected to the destination subsystem that consumes the transactions. A source subsystem may sporadically issue transactions since, for example, the source subsystem may frequently have tasks to accomplish that do not require producing transactions. A destination subsystem may sporadically accept transactions since, for example, the destination may be able to process only one transaction at a time, with a processing time for each transaction that is dependent on the type of transaction. With a source directly connected to a destination, transfer of a transaction from the source to the destination may require that the source is ready to issue a transaction at the same time that the destination is ready to accept a transaction. Thus, a source and a destination are tightly coupled when they are directly connected. Performance may be impacted by a source that cannot issue a transaction because the source is tightly coupled to a destination that is unable to accept a transaction.

Application throughput may be increased by relaxing the tight coupling of source and destination subsystems of a computer system by inserting a queuing function between the source and destination. Transactions issued by the source may be temporarily stored in the queue. The source sends transactions to the queue whenever the source is ready to issue a transaction and the queue is not full, and the destination receives transactions from the queue whenever the destination is ready to accept a transaction and the queue is not empty. Typically, such a queue is a first-in first-out (FIFO) queue. The destination receives transactions from the queue in the same order that the transactions were sent to the queue by the source.

For certain FIFO implementations, the FIFO causes an insertion delay such that the source-to-FIFO and FIFO-to-destination transfers are separate steps causing a total transfer delay that is greater than the transfer delay of a direct source-to-destination transfer. However, application throughput may be increased by the insertion of a FIFO despite the FIFO insertion delay. For other FIFO implementations, the FIFO insertion delay is eliminated by a bypass path providing direct source-to-destination transfer with the bypass path typically used when the FIFO is empty.

A FIFO may temporarily store transactions, but a FIFO preserves the order of transactions. A further measure to increase application performance may relax the ordering of transactions. Transactions may be classified into high and low priority transactions with application performance having a strong dependence on the processing of high priority transactions and application performance having less dependence on the processing of low priority transactions. Relaxing the ordering of transactions may be based on transaction priority. For example, a processor issuing a read request may be prevented from performing further tasks until the read response is received from a memory, while a processor issuing a write request may be able to perform further tasks independent from the completion of the write to memory. Thus, application performance may have a strong dependence on the processing of read requests by memory and a weak dependence on the processing of write requests by memory. Transaction reordering that allows a high priority read request to be processed before a previously issued low priority write request may improve application performance.

The reordering of transactions may be limited in certain scenarios. Two transactions that should be processed in the order that the two transactions were issued are denoted as conflicting transactions. Note that two conflicting transactions that should not be reordered are not necessarily adjacently issued transactions. Computer systems may have a set of rules specifying the transactions that conflict and thus should not be reordered. For example, typically a write transaction to a particular address may conflict with a following read transaction to the same address because the read transaction will receive the incorrect stale data should the write and read transactions be reordered. Logic that permits transactions reordering may need to detect conflicts and prevent the reordering of conflicting transactions.

The present invention is directed generally to a method and apparatus for queuing transactions with possible reordering based on transaction priority. Transactions may be reordered by various embodiments of the invention such that a high priority transaction may be forwarded prior to the forwarding of a subsequently received low priority transaction. The reordering based on transaction priority may improve computer system performance, while maintaining a substantially reduced complexity as compared to past approaches for prioritized queuing.

According to an exemplary embodiment, the design includes a first and a second FIFO buffer along with a priority check module. All transactions, regardless of priority, initially enter the first FIFO buffer. The priority check module ascertains the priority of the transactions within the first FIFO buffer. In general, lower priority transactions are sent to the second FIFO buffer and higher priority transactions are forwarded to their next destination location. The higher priority transactions bypass the second FIFO buffer to increase the transfer efficiency for higher priority transactions.

The second FIFO buffer may be coupled to logic that determines if a conflict occurs between the next available transaction from the first FIFO buffer and any transaction within the second FIFO buffer. Transactions are then transferred from the second FIFO buffer until the conflict is resolved.

The priority check module may ascertain transaction priority in various ways. For example, the priority check module can ascertain the priority level as a function of transaction type such as read or write operation, data request size, urgency, source location, and/or destination location. The priority check module may be disabled if desired. For a disabled priority check module, transactions may be transferred in a traditional first-in, first-out manner to their next destination location regardless of their relative priority.

FIG. 1 illustrates a block diagram of a prioritized transaction queuing circuit in accordance with various embodiments of the present invention. The queuing circuit 100 forwards transactions according to the priority of the transactions with a simple design implementation. The queuing circuit 100 may reorder transactions, thereby potentially increasing computing system performance.

The simple design implementation of the queuing function 100 includes a main FIFO buffer 102, an aside FIFO buffer 104, a priority check module 106, and an output multiplexer 108. The main FIFO 102 receives transactions on transaction-input lines 110 from a source such as one or more processors or one or more memory banks within a computing system. The main FIFO 102 may temporarily store each transaction until the transaction is either forwarded to a destination or transferred to aside FIFO 104. The aside FIFO 104 may temporarily store certain transactions until the transactions may be forwarded to the destination. Transactions from the main FIFO 102 and the aside FIFO 104 are forwarded to a destination, such as one or more processors or memory banks, on transaction-out lines 112 via multiplexer 108. A transaction may be temporarily stored in the main FIFO 102 and/or the aside FIFO 104 until a destination is ready to receive the transaction.

Each transaction may include a header component and a data component. The header component may include the type of operation, source identifier, destination address location, transaction data size, and relative urgency of the transaction. The type of operation may include instruction memory read, data memory read, data memory write, input-output read, and input-output write. Various urgency levels, ranging from two levels to a large number of levels, may be stored in the header component. The priority check module 106 determines the priority of the transaction from its header component.

In one example embodiment of the present invention, transactions may be either high or low priority. The priority check module 106 may ascertain the priority level of a next main transaction 114, which is the next transaction that is available from the main FIFO 102. In general, if the next main transaction 114 has a low priority level then the priority check module 106 asserts the set aside line 116 to transfer the next main transaction 114 from the main FIFO 102 to the aside FIFO 104. The aside FIFO 104 temporarily stores the low priority transaction. When the aside FIFO 104 is full, transfer of a low priority transaction from the main FIFO 102 to the aside FIFO 104 may be delayed until one of the transactions already in the aside FIFO 104 is forwarded to a destination. In general each low priority transaction is stored in the aside FIFO 104 before being forwarded to a next destination.

If the next main transaction 114 has a high priority level, then the high priority transaction bypasses the aside FIFO 104. The priority check module 106 may steer the multiplexer 108 with multiplexer control line 118 to transfer the high priority transaction from the main FIFO buffer 102 to a destination via transaction-output lines 112. When the next main transaction 114 is not a high priority transaction or the main FIFO 102 is empty, the priority check module 106 may control the multiplexer 108 with multiplexer control line 118 so that a next aside transaction 120 is provided from the aside FIFO 104 to a destination via transaction-output lines 112.

The reordering of transactions that occurs when a high priority next main request 114 bypasses low priority transactions in the aside FIFO 104 may need to be prevented in certain scenarios. For example, a computer system may have coherency rules that specify transactions that should not be reordered. Violation of the coherency rules may cause the computer system to calculate improper results. Detection of conflicting transactions that should not be reordered may be provided by logic in the aside FIFO 104, and the detection of a conflict between the next main request 114 and any transaction in the aside FIFO 104 may be signaled by the conflict line 122. When a conflict is detected, the priority check module 106 may keep the next main transaction 114 in the main FIFO 102 until the conflict is resolved by forwarding one or more transactions in the aside FIFO 104 to a destination.

The priority check module 106 can be disabled such that all transactions bypass the aside FIFO 104 allowing the queuing circuit 100 to function as a true FIFO. Disabling the priority check module 106 may be equivalent to making all transactions high priority transactions.

In one example embodiment of the present invention, a priority check module 106 ascertains different priority levels depending on the destination location for the transaction. For example, a transaction with an address mapped to an input-output location, such as a location associated with a disk drive, may be considered low priority while a transaction with an address mapped to RAM memory may be considered high priority.

In another embodiment of the present invention, a priority check module 106 ascertains different priority levels depending on the source identifier for the transaction. For example, a transaction with a source identifier of an input-output controller may be assigned a low priority while a transaction with an identifier of a processor, cache, or memory may be assigned a high priority.

In a preferred embodiment of the present invention, a priority check module 106 ascertains different priority levels based on the operation type of a transaction. For example, a read operation may be considered a high priority request and a write operation may be considered a low priority request. The priority check module 106 may send a low priority write request from main FIFO buffer 102 to a write-set aside (WSA) FTFO buffer (not shown in FIG. 1), which provides similar functionality as aside FIFO buffer 104. The priority check module 106 may send a high priority read request from the main FIFO buffer 102 to a next destination by bypassing the WSA FIFO buffer. In general low priority write requests are sent to the WSA FIFO buffer before arriving at a next destination.

In an alternative embodiment of the present invention, the priority check 106 ascertains different priority levels depending on data size of a transaction. For example, data requests that are greater than a predetermined size may be considered high priority, whereas data requests less than or equal to the predetermined size may be considered of a lower priority.

Figure 2:
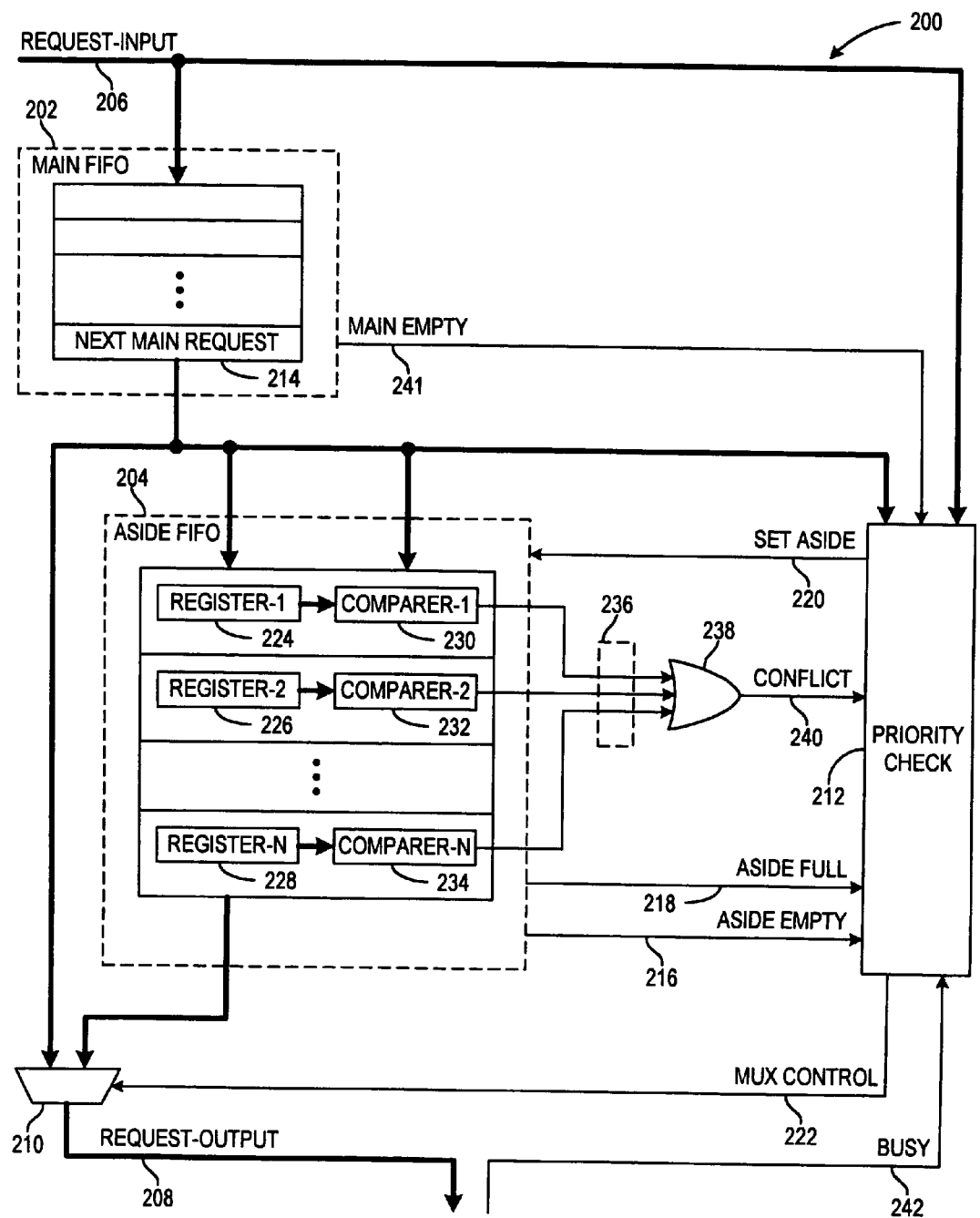
FIG. 2 illustrates a block diagram for queuing prioritized transaction requests and resolving conflicts in accordance with the present invention.

FIG. 2 illustrates a block diagram of a prioritized queuing circuit for temporarily storing and transferring requests in accordance with various embodiments of the present invention. The queuing circuit 200 represents similar functionality as the prioritized queuing circuit 100 from FIG. 1. The queuing circuit 200 is a more specific implementation of the queuing circuit 100. The prioritized queuing circuit 200 includes main FIFO buffer 202 and aside FIFO logic 204.

The main FIFO buffer 202 receives data requests on request-input lines 206 from various source locations such as multiple processors or memory banks within a computing system. The main FIFO buffer 202 represents similar functionality as the main FIFO buffer 102 from FIG. 1. Certain data requests are transferred from the main FIFO buffer 202 to the aside FIFO logic 204. Data requests temporarily held in the main FIFO 202 or the aside FIFO 204 are eventually forwarded to the request-output lines 208 via multiplexer 210 under control of the priority check module 212.

The priority check module 212 ascertains the priority of data requests, controls the transfer of data requests within the queuing circuit 200, and resolves addressing conflicts between data requests.

In general, the priority check module 212 transfers a next main request 214 having a low priority from the main FIFO 202 to the aside FIFO 204. However, if the aside FIFO 204 is empty, as indicated by aside empty line 216, then the priority check module 212 allows a next main request 214 having a low priority to bypass the aside FIFO 204. In this case, the request is passed directly from the main FIFO 202 to the request-output lines 208 via the multiplexer 210. Low priority requests may therefore be transferred more efficiently by bypassing an empty aside FIFO 204. For example, the bypass path may allow a next main request 214 to be transferred from the main FIFO 202, through the multiplexer 210, and to a destination via request-output lines 208 in a single computer system clock cycle. In contrast, transfer of a next main request 214 through an empty aside FIFO 204 may require one cycle to transfer the next main request 214 from the main FIFO 202 to the aside FIFO 204 and an additional cycle to transfer the request from the aside FIFO 204, through the multiplexer 210, and to a destination via request-output lines 208.

A next main request 214 having a low priority may be prevented from immediately transferring to the aside FIFO 204 when the aside FIFO 204 is full, as indicated by aside full line 218. When the aside FIFO 204 is full and the next main request 214 has a low priority, then the next request provided on request-output lines 208 is obtained from the aside FIFO 204. Once a request has been transferred from a full aside FIFO 204, the aside FIFO 204 is no longer full, and the next main request 214 having a low priority may be transferred from the main FIFO 202 to the aside FIFO 204. The priority check module 212 writes a next main request 214 into the aside FIFO 204 by asserting the set aside signal on line 220.

At substantially the same time as a low priority request is stored within aside FIFO 204, another low priority request already in the aside FIFO 204 may be transferred to request-output lines 208 via multiplexer 210. Such simultaneous transfer of requests in and out of the aside FIFO 204 may be done when the main FIFO 202 does not contain any high priority requests. When the main FIFO 202 does contain at least one high priority request, the transfer of requests out of the aside FIFO 204 is suspended so that a destination is not busy receiving a low priority request while a high priority request is available. The priority check module 212 may maintain a count of the number of high priority requests in the main FIFO 202 by monitoring the request-inputs lines 206 and incrementing the counter whenever a high priority request is stored into the main FIFO 202, and by decrementing the counter whenever a high priority request is removed from the main FIFO 202.

The priority check module 212 gates a next main request 214 having a high priority from the main FIFO buffer 202 to request-output lines by providing control line 222 to multiplexer 210. The performance of an application program executed by the computer system may be improved by the reordering of transactions that occurs when high priority requests bypass the low priority requests that are temporarily held in the aside FIFO 204.

The aside FIFO 204 may include registers 224, 226-228 with respective associated comparers 230, 232-234. The number of registers (and associated comparers) varies with the queue depth of the aside FIFO 204. When a next main request 214 having a low priority is transferred to the aside FIFO 204, the contents of the next main request 214 is transferred to one of the registers 224, 226-228. Each of registers 224, 226-228 is capable of storing a respective data request.

Each of the comparers 230, 232-234 compares the destination address of the next main request 214 currently available from the main FIFO 202 with the destination address of the request contained in the associated register 224, 226-228, respectively. Each of the comparers 230, 232-234 may generate a match signal on a respective one of lines 236 when the destination address of the next main request 214 matches the destination address of the request contained in the associated register 224, 226-228, respectively. OR gate 238 performs the logical OR of the match lines 236 to generate the conflict signal on line 240. If the destination address of the next main request 214 matches the destination address of any data request in the aside FIFO 204, then a conflict may exist. In this embodiment, the destination address is used to detect the conflict. In general, however, any portion of the contents of the next main request 214 and the registers 224 226-228 may be used to detect a conflict.

While a conflict exists, the next main request 214 may be blocked and prevented from being forwarded to request-output lines 208. The priority check module 212 may prevent the forwarding of next main request 214 by controlling line 222 so that multiplexer 210 selects requests from the aside FIFO 204 to the request-output lines 208. While a conflict exists, requests are transferred from the aside FIFO 204 to the request-output lines 208 until the request or requests responsible for the conflict have been transferred from the aside FIFO to the request-output lines 208, whereupon the conflict signal 240 is deactivated.

The main FIFO 202 may be empty as indicated by line 241. While the main FIFO 202 is empty and the aside FIFO 204 is not empty, requests are sent from the aside FIFO 204 to the request-output lines 208 via multiplexer 210.

In some cases, a request that is gated onto request-output lines 208 in any of the foregoing ways will not be accepted by the destination because the destination is busy. A destination device indicates this status on busy line 242. When a request is selected by the queuing circuit 200 but not accepted by a destination because it is busy, the request is not removed from the associated FIFO. The request is transferred to the destination at a later time when the destination is not busy.

While the destination is busy as indicated by busy line 242, the queuing circuit 200 may switch the request that is provided on request-output lines 208. For example, assume that the main FIFO 202 is empty while the aside FIFO 204 stores at least one request, causing queuing circuit 200 to select a next request from the aside FIFO 204 for presentation on request-output lines 208. Assume further that at this time, the busy signal is activated such that this request is not provided to the destination device. While the destination device remains busy, a source device may write a high priority transaction into the main FIFO 202. As soon as the high priority transaction becomes available as next main request 214 within main FIFO 202, queuing circuit 200 will attempt to transfer this next main request.

The above discussion of a queuing circuit 200 involving a main FIFO buffer 202 and an aside FIFO buffer 204 applies to a preferred embodiment. In this preferred embodiment, aside FIFO buffer 204 is a write set aside (WSA) FIFO buffer. In one implementation, write set aside (WSA) FIFO buffer may be functionally identical to aside FIFO buffer 204. For the preferred embodiment, the priority check module 212 assigns write requests with low priority and read requests with high priority. In general, low priority write requests are sent from the main FIFO buffer 202 to the WSA FIFO buffer and high priority read requests bypass the WSA FIFO buffer. For the preferred embodiment, read requests may be transferred more efficiently at the expense of delayed write requests. The WSA FIFO buffer may detect conflicts by comparing the destination address of the next main request 214 from the main FIFO 214 to the destination address of each of the requests in the WSA FIFO.

Figure 3:
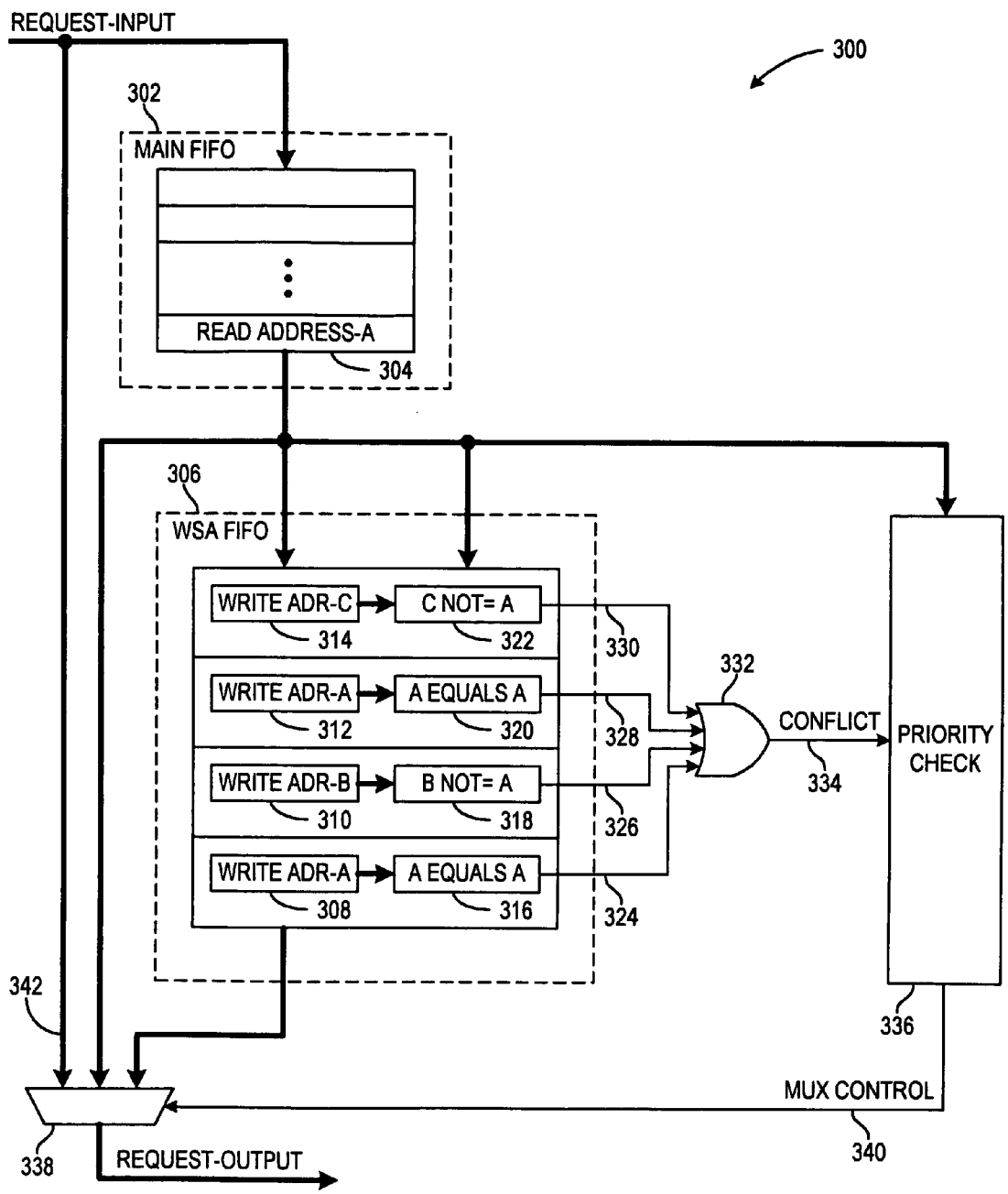
FIG. 3 illustrates a block diagram of an example for resolving address conflicts in accordance with the present invention.

FIG. 3 illustrates a block diagram of an example for resolving address conflicts in accordance with the present invention. The next request from the main FIFO 302 is a high priority request to read from address-A 304. The WSA FIFO 306 contains four low priority write requests 308, 310, 312, and 314 that were received in the order of first write request to address-A 308, second write request to address-B 310, third write request to address-A 312, and fourth write request to address-C 314.

Each of WSA FIFO 306 requests 308, 310, 312, and 314 has an associated comparer 316, 318, 320, and 322, respectively. Comparer 316 compares the address of read request from address-A 304 to the write request to address-A 308 resulting in a match on line 324. Comparer 318 compares the address of read request from address-A 304 to the write request to address-B 310 resulting in no match on line 326. Comparer 320 compares the address of read request from address-A 304 to the write request to address-A 312 resulting in a match on line 328. Comparer 322 compares the address of read request from address-A 304 to the write request to address-C 314 resulting in no match on line 330.

OR gate 332 performs the logical OR of the match on lines 324 and 328 and no match on lines 326 and 330 to yield a detected conflict on line 334. Due to the detected conflict, the priority check module 336 does not forward the high priority read request from address-A 304 until the conflict is resolved. The priority check module 336 steers the multiplexer 338 with control line 340 to forward requests from the WSA FIFO 306. The first low priority write request received, write request to address-A 308, is the first request forwarded. The entry in WSA FIFO 306 for write request to address-A 308 may be cleared after being forwarded, resulting in comparer 316 no longer detecting a match. However, a conflict may continue to be detected due to write to address-A 312. Because of the continued conflict, the read request from address-A 304 is not yet forwarded. Next, the second low priority write request received, write request to address-B 310, is provided on request-output lines. This does not resolve the conflict. Therefore, the third low priority write request received, write request to address-A 312, is selected. This resolves the conflict. The high priority read from address-A 304 may then be forwarded on the request-output lines before the lower priority write request to address-C 314 is selected.

Detection of a conflict is not necessary if a next main request from main FIFO 302 is low priority. This is because low priority requests are not reordered ahead of other requests. Therefore, the comparers 316, 318, 320, and 322 may be enabled to generate respective match signals on lines 324, 326, 328, and 330 based on the operation type of the next main request. Alternatively, the conflict signal on line 334 may be qualified by the next main request 304 being a high priority transaction. A bypass path 342 may be used when the main FIFO 302 is empty and the WSA FIFO 306 is empty.

Figure 4:
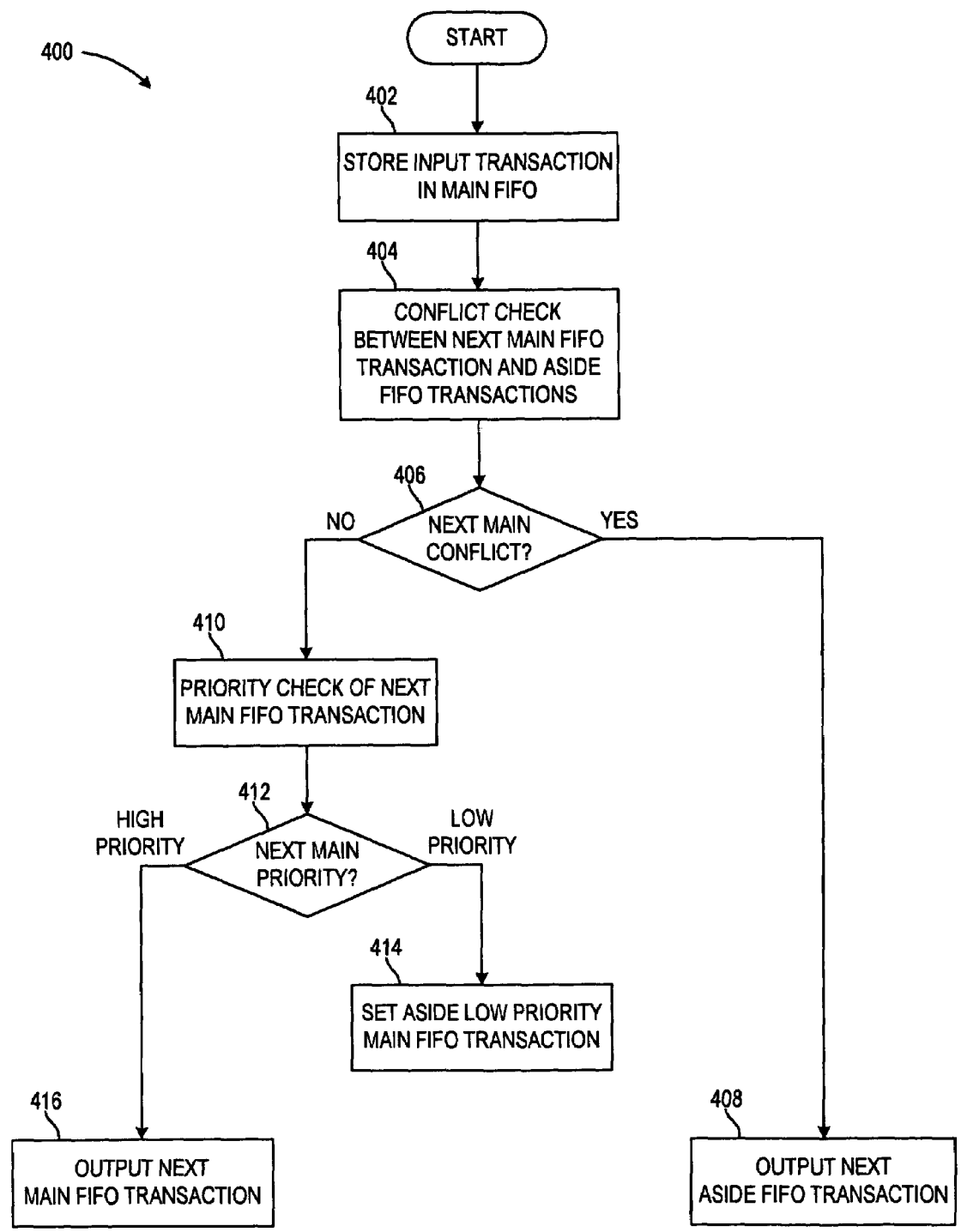
FIG. 4 illustrates a flow chart of a process for queuing prioritized transaction requests in accordance with the present invention.

FIG. 4 illustrates a flow chart of a process for queuing prioritized transactions in accordance with the present invention. All transactions are stored in a main FIFO at step 402. The transactions are temporarily stored in the main FIFO buffer. The main FIFO is functionally similar to a main FIFO buffer 102 in FIG. 1. Later each stored transaction becomes the next main transaction available from the main FIFO in the order the transactions are stored. At step 404 the next main transaction is checked for conflicts with one or more of the transactions stored in an aside FIFO having similar functionality as a aside FIFO buffer 104 in FIG. 1.

The decision step 406 examines the result of the conflict check. For a detected conflict, the next main transaction is blocked and the process 400 proceeds to step 408 with the output of the next aside transaction from the aside FIFO. The actual transfer of the next aside transaction at step 408 is dependent upon the destination accepting the transfer. A destination may be busy and thus unable to accept a transaction.

Returning to decision step 406, if no conflict is detected, the process 400 proceeds to step 410 where the priority of the next main transaction from the main FIFO is determined. The resulting priority level is checked at decision 412. For a low priority transaction, the process 400 proceeds to step 414 and the low priority transaction is set aside by transferring the low priority transaction to the aside FIFO. For a high priority transaction, the process 400 proceeds to step 416 and the high priority transaction is transferred.

Figure 5:
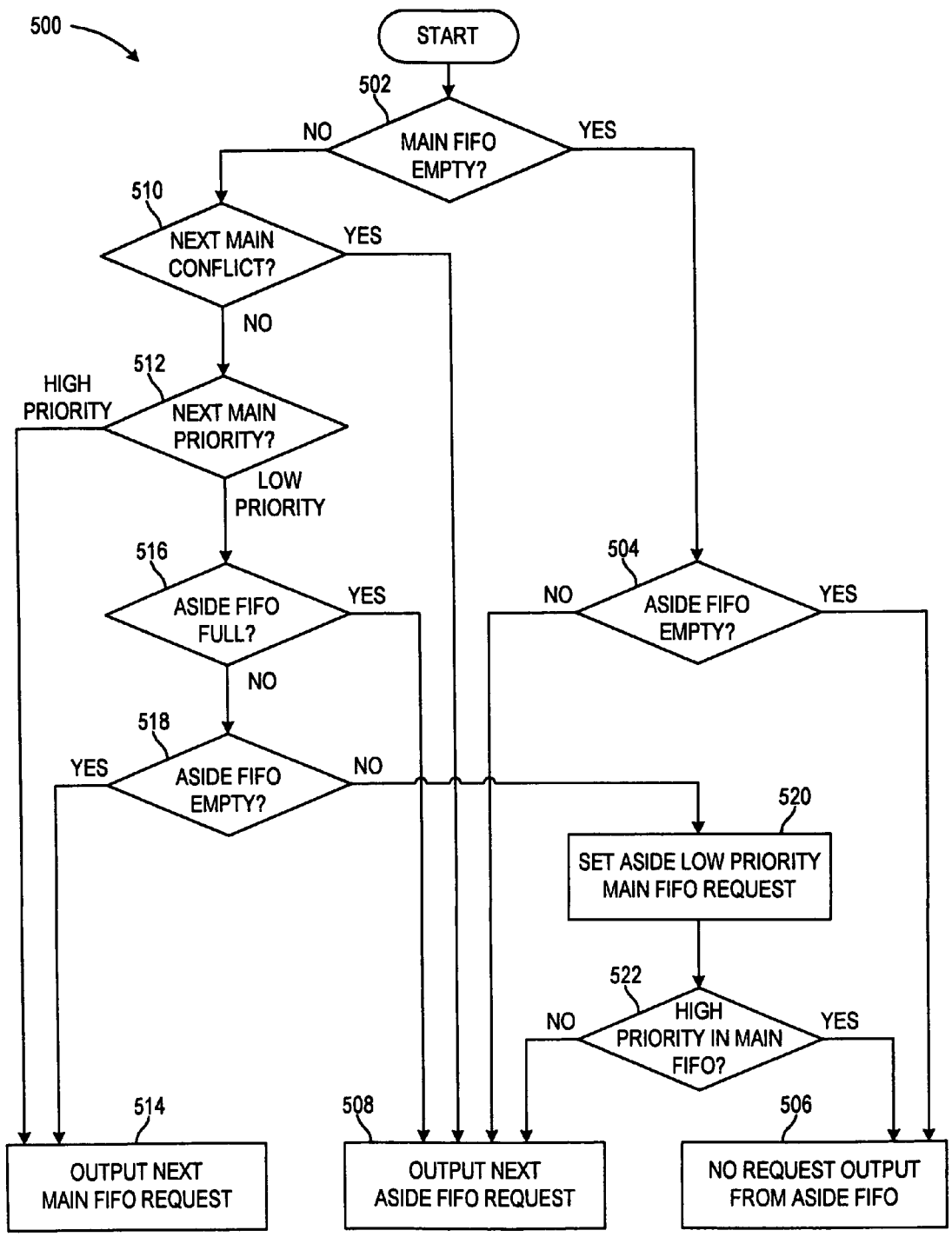
FIG. 5 illustrates a flow chart of a process for selecting a queued transaction request to output based on request priority and conflicts in accordance with the present invention.

FIG. 5 illustrates a flow chart of a process for selecting a queued transaction request based on request priority and conflicts in accordance with the present invention. The process 500 is a decision tree with decisions made in a particular order. It will be appreciated that the decision tree may have the decisions reordered or the decisions made in parallel with similar results.

Decision 502 checks whether the main FIFO is empty. If so, the process 500 proceeds to decision 504. Decision 504 checks whether the aside FIFO is empty. For an empty aside FIFO, the process 500 proceeds to step 506 and no request is forwarded because both the main FIFO and the aside FIFO are empty. In one embodiment, a bypass path is enabled when both the main FIFO and the aside FIFO are empty such that a request is output if a request becomes available.

Returning to step 504, for a non-empty aside FIFO, the process 500 proceeds from step 504 to step 508 and the next request from the aside FIFO is output. In one embodiment, decision 504 is omitted with decision 502 for an empty main FIFO proceeding directly to step 508, where the next aside request from the aside FIFO is output with this next aside request being a null request when the aside FIFO is empty.

Process 500 proceeds from decision 502 to decision 510 for a non-empty main FIFO. Decision 510 checks for a conflict between the next main request and one or more of any requests in the aside FIFO. A conflict may be detected for a next main request that is a high priority request. The conflict may be detected by checking for a match between a portion or portions of the next main request and a corresponding portion or portions of each of the requests in the aside FIFO. The conflict may be detected by checking for a match between the destination addresses of the respective requests. For a detected conflict, the next main request is blocked until the conflict is resolved by outputting the conflicting request or requests from the aside FIFO. Therefore, process 500 proceeds to step 508 to output the next aside request from the aside FIFO.

Returning to step 510, if no conflict exists, the process 500 proceeds to decision step 512. The priority of the next main request from the main FIFO is checked at decision 512. For a next main request having a high priority, the process 500 proceeds to step 514 and the next main request having high priority is output, potentially improving computing system performance by bypassing low priority requests in the aside FIFO. For a next main request having a low priority, the process 500 proceeds to decision 516.

Decision 516 checks whether the aside FIFO is full. For a full aside FIFO, the process 500 proceeds to step 508 and a low priority request from aside FIFO is output. For a full aside FIFO, the available next main request having a low priority cannot immediately be set aside to the aside FIFO in one embodiment. In another embodiment, the next main request having a low priority may immediately be set aside to the aside FIFO when the destination simultaneously accepts the next aside request output at step 508. For an aside FIFO that is not full, the process 500 proceeds to decision 518.

Decision 518 checks whether the aside FIFO is empty. For an empty aside FIFO, the process 500 proceeds to step 514 and the next main request having low priority is output instead of being set aside in the aside FIFO. The empty aside FIFO may indicate that the destination is processing requests faster than the source can issue requests and the bypass of a next main request having low priority around an empty aside FIFO may hasten the forwarding of the request to a likely non-busy destination.

Returning to decision 518, for a non-empty aside FIFO, the process 500 proceeds to step 520 where the next main request having low priority may be set aside in the aside FIFO. The set aside of the next main request having low priority may be done even though the destination does not accept a next aside request that may be output by process 500 at step 508. A series of requests having low priority may be transferred from the main FIFO to the aside FIFO while the destination is busy and cannot accept requests.

Decision 522 checks whether a high priority request is present somewhere in the main FIFO. When the main FIFO does not contain a high priority request, the process 500 proceeds to step 508 and a next aside request is output from the aside FIFO. When the main FIFO does contain a high priority request, the process 500 proceeds to step 506 and no request is output from the aside FIFO. This prevents the destination from becoming busy processing a low priority request when a high priority request is available.

A non-empty aside FIFO may indicate that the destination is not currently processing requests faster that the source can issue requests. Since the destination may be delaying the processing of some requests, not outputting a low priority request when the a low priority request is available may not hurt performance, and later bypassing a high priority request around this low priority request may improve performance.

The request selected by process 500 may or may not be accepted by the destination depending upon whether the destination is busy. While the destination is busy, the decision tree of process 500 may be repeatedly evaluated and the decisions made and the requests provided may vary while the destination is busy.

Figure 6:
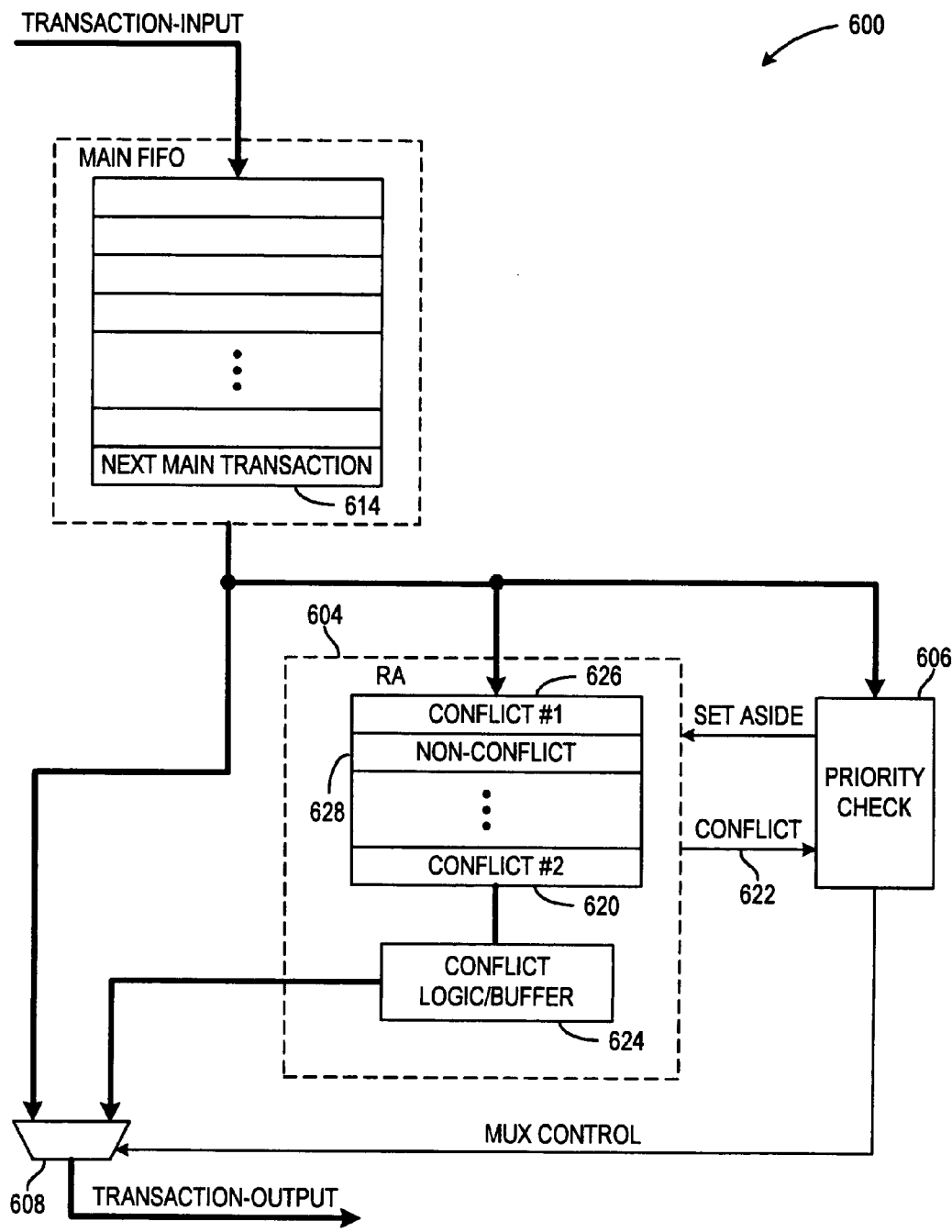
FIG. 6 illustrates an alternate embodiment of a block diagram for queuing prioritized transaction requests in accordance with the present invention.

FIG. 6 illustrates a block diagram of a prioritized transaction queuing circuit in accordance with an alternate embodiment according to the present invention. Similar to queuing circuit 100 of FIG. 1, queuing circuit 600 forwards transactions according to the priority of the transactions with a simplified design approach. However, an alternate operation with regard to a conflict being detected between next main transaction 614 and conflicting transactions 620 and 626 contained within aside Register Array (RA) 604 is contemplated.

In particular, logic within conflict logic/buffer block 624 determines that a match exists between the address associated with transactions 620 and 626 contained within Register Array 604 and the address associated with next main transaction 614. As a result, a conflict condition is signalled on line 622, causing priority check module 606 to stall the forwarding of next main transaction 614 until the conflict condition is resolved.

Two transactions, 620 and 626 within RA 604, represent address conflicts as compared to next main transaction 614. Instead of forwarding transactions 620, 626, and 628 in FIFO order until the conflict condition is released, conflict logic/buffer block 624 first determines the position of transactions 620 and 626 within RA 604. Once the position is known, transactions 620 and 626 may be removed from RA 604, buffered by conflict logic/buffer block 624, and forwarded via multiplexer 608.

In so doing, the conflict condition is resolved, even though non-conflicting transaction 628 remains within RA 604. In this way, RA 604 is not needlessly vacated of non-conflicting transactions in order to resolve the conflict condition. Considering the case where a significant number of non-conflicting entries separate two or more conflicting transactions, a large amount of non-conflicting transaction overhead may be necessary in order to rectify the conflicting condition. Usage of the embodiment exemplified by FIG. 6, therefore, obviates needless transaction overhead that may be necessary to resolve the address conflict.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for prioritized queuing of transactions, comprising:
   a first buffer coupled to receive transactions;
   a priority check module coupled to the first buffer and adapted to detect a priority level of the transactions received at the first buffer;
   a second buffer coupled to the first buffer and adapted to receive transactions from the first buffer that are identified by the priority check module to have low priority;
   a multiplexer having inputs coupled to the first and second buffers, and having a control input: and
   wherein the priority check module is further adapted to provide a control signal to the control input of the multiplexer to enable the transactions from the first buffer that are identified to have a high priority to bypass the second buffer and be output by the multiplexer.

2. The circuit according to claim 1, wherein the priority check module is further adapted to determine a forwarding schedule for the received transactions.

3. The circuit according to claim 1, wherein the second buffer further comprises conflict logic adapted to determine a location of each transaction in the second buffer having an address conflict with transactions in the first buffer.

4. The circuit according to claim 3, wherein the second buffer further comprises a conflict buffer adapted to store each transaction in the second buffer having an address conflict with transactions in the first buffer.

5. A method comprising:
- entering transaction requests into a first first-in-last-out (FIFO) queue adapted to receive transactions;
- determining a priority of the transaction requests reaching an output of the first FIFO queue;
- entering the transaction requests having a first priority from the output of the first FIFO queue into a second FIFO queue, wherein the input of the second FIFO queue is coupled to the output of the first FIFO queue; and
- directing, in response to the determined priority of the transaction requests reaching the output of the first FIFO queue, requests having a first priority from the output of the first FIFO queue to their respective destinations so that these first priority requests bypass the second FIFO queue.

6. The method of claim 5, wherein the first priority is a lower priority relative to the second priority.

7. The method of claim 5, further comprising directing the transaction requests from an output of the second FIFO queue to their respective destinations when no transaction requests having the first priority are present in the first FIFO queue.

8. The method of claim 5, wherein determining the priority based on information in a header comprises determining the priority based on a priority indicator in the header of the respective transaction request.

9. The method of claim 5, wherein determining a priority of the transaction requests comprises identifying the priority of the transaction request at the output of the first FIFO queue based on a destination identifier of the transaction request.

10. The method of claim 5, wherein determining a priority of the transaction requests comprises identifying the priority of the transaction request at the output of the first FIFO queue based on a source identifier of the transaction request.

11. The method of claim 5, wherein determining a priority of the transaction requests comprises identifying the priority of the transaction request at the output of the first FIFO queue based on an operation type of the transaction request.

12. The method of claim 11, wherein the operation type is a read operation, and wherein identifying the priority of the transaction request at the output of the first FIFO queue comprises designating a high priority rating to the read operation relative to the priority of a write operation.

13. The method of claim 5, wherein determining a priority of the transaction requests comprises identifying the priority of the transaction request at the output of the first FIFO queue based on a data size of the transaction request.

14. The method of claim 5, further comprising controllably disabling the determining of the priority of the transaction requests and the entering of transaction requests into the second FIFO queue, and directing all of the transaction requests from the first FIFO queue to their respective destinations.

* * * * *